United States Patent [19]
Yao et al.

[11] Patent Number: 5,639,285
[45] Date of Patent: Jun. 17, 1997

[54] POLYCRYSTALLLINE CUBIC BORON NITRIDE CUTTING TOOL

[75] Inventors: Xian Yao, Sandy; Matthew W. Collier, Provo; Madapusi K. Keshavan; Ghanshyam Rai, both of Sandy, all of Utah

[73] Assignee: Smith International, Inc., Houston, Tex.

[21] Appl. No.: 440,773

[22] Filed: May 15, 1995

[51] Int. Cl.$^6$ .................................................. B24D 3/00
[52] U.S. Cl. .................. 51/307; 428/403; 428/404; 428/697; 428/698; 428/699; 428/704; 51/295; 501/87; 501/96.4
[58] Field of Search ........................ 428/704, 698, 428/697, 699, 403, 404; 51/295, 307; 501/87, 96

[56] References Cited

U.S. PATENT DOCUMENTS

| | | | |
|---|---|---|---|
| 4,311,590 | 1/1982 | Bovenkerk et al. | 51/307 |
| 4,403,015 | 9/1983 | Nakai et al. | 428/565 |
| 4,596,693 | 6/1986 | Ishizuka et al. | 419/16 |
| 4,619,698 | 10/1986 | Ueda et al. | 75/238 |
| 4,647,546 | 3/1987 | Hall, Jr. et al. | 501/96 |
| 4,788,166 | 11/1988 | Araki et al. | 501/96 |
| 4,807,402 | 2/1989 | Rai | 51/293 |
| 4,915,903 | 4/1990 | Brupbacher et al. | 420/129 |
| 5,037,704 | 8/1991 | Wakai et al. | 428/408 |
| 5,271,749 | 12/1993 | Rai et al. | 51/293 |
| 5,320,988 | 6/1994 | Corligan | 501/96 |
| 5,326,380 | 7/1994 | Yao et al. | 51/293 |
| 5,441,817 | 8/1995 | Rai | 428/551 |

*Primary Examiner*—Archene Turner
*Attorney, Agent, or Firm*—Christie, Parker & Hale, LLP

[57] ABSTRACT

A polycrystalline cubic boron nitride cutting tool is from 50 to 85% by weight cubic boron nitride crystals bonded together as a polycrystalline mass. A supporting phase commingled with the polycrystalline cubic boron nitride is made from 15 to 40% by weight of a refractory material which is preferably titanium carbonitride or titanium aluminum carbonitride. The starting composition also comprises from 4 to 10% by weight of $Co_2Al_9$. Mixed powders of these ingredients are treated in ammonia at a temperature in the range of from 1000° to 1250° C., which significantly increases the nitrogen content and reduces carbon content of titanium carbonitride. Instead of mixed powders of the starting materials, coated particles may be used such as cubic boron nitride coated with titanium carbonitride, or titanium carbonitride coated with cobalt, aluminum or cobalt aluminide. Hexagonal boron nitride may be substituted as a starting material for a portion of the cubic boron nitride.

18 Claims, 2 Drawing Sheets

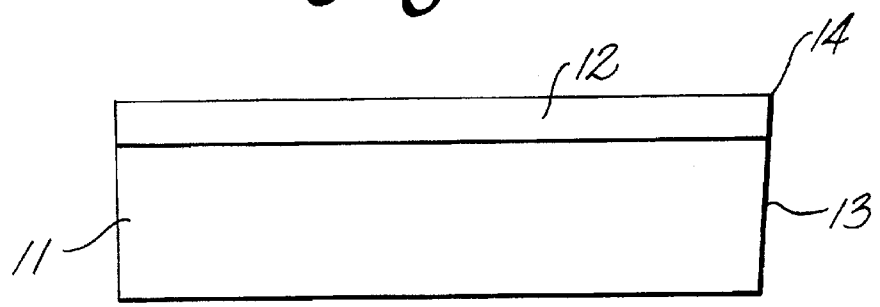
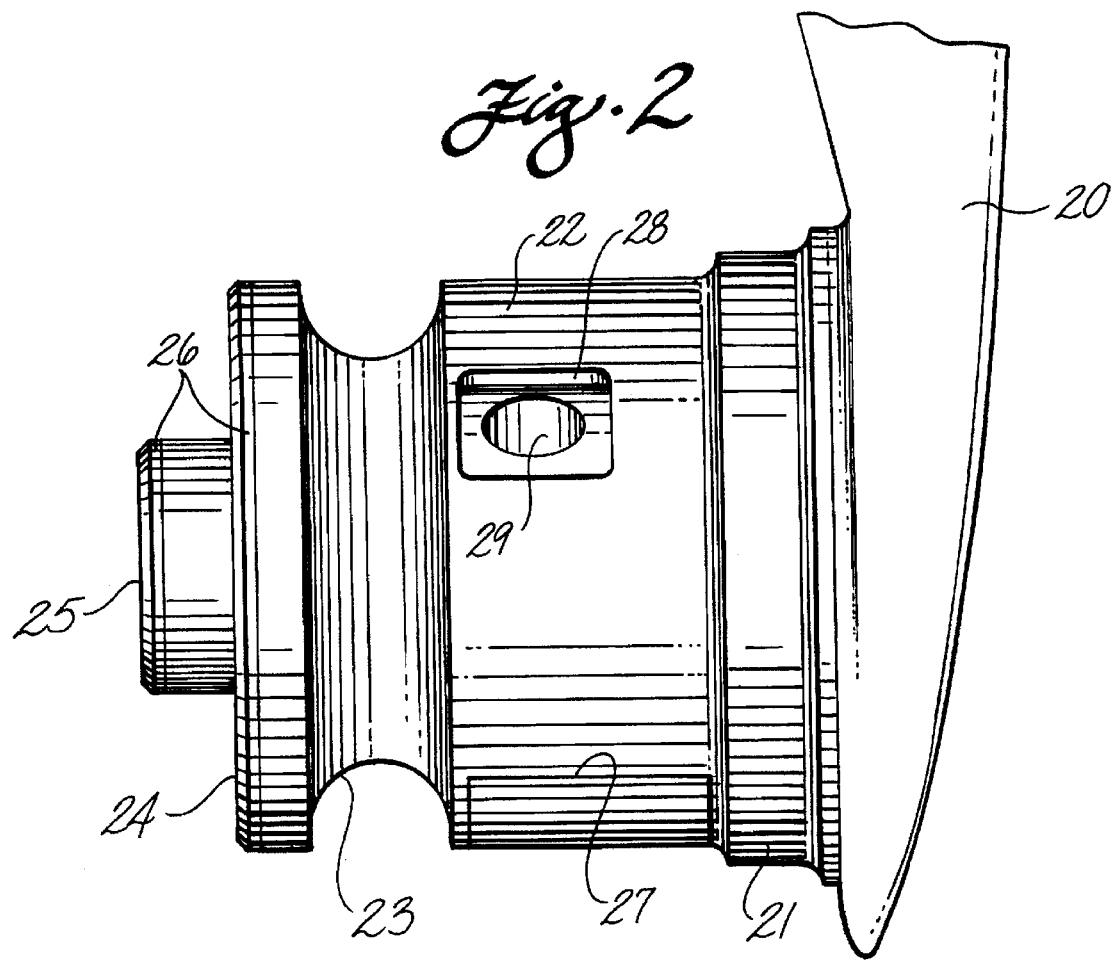

POLYCRYSTALLLINE CUBIC BORON NITRIDE CUTTING TOOL

BACKGROUND

This invention relates to a polycrystalline composite compact of cubic boron nitride including titanium carbonitride and cobalt aluminide as a supporting phase, which is particularly useful as a tool for machining ferrous metals. In the process for making the compact a mixture of cubic boron nitride (CBN) crystals, titanium carbonitride (TiCN) and $Co_2Al_9$ are treated at elevated temperature in ammonia to reduce oxygen and carbon and increase nitrogen. The mixture is then subjected to high temperatures and pressures where CBN is thermodynamically stable for forming polycrystalline cubic boron nitride.

The high pressure form of boron nitride, known as cubic boron nitride, is surpassed only by diamond in hardness and has a variety of uses as cutting tools and the like. Polycrystalline CBN is useful, for example, for high speed machining of ferrous metals where reaction of diamond with iron is a problem. Cutting tools are in the marketplace or are described in prior art patents employing cubic boron nitride and a binder phase of a refractory material such as titanium nitride, titanium carbide, titanium carbonitride and solid solutions thereof. Such compacts have excellent abrasive wear resistance, thermal stability, thermal conductivity, impact resistance and coefficient of friction for use as a cutting tool.

It is always desirable, however, to improve the quality, reliability, properties, lifetime and sharpness of materials employed for cutting tools.

U.S. Pat. No. 4,334,928 describes sintered compacts of CBN for use in cutting tools employing as a binder a variety of materials including carbides, nitrides, carbonitrides, borides and silicides of group IVa, Va and VIa group transition metals. According to this description, such materials in the binder phase form a continuous matrix with high pressure boron nitride (i.e., CBN) interspersed within the matrix. The principal material disclosed comprises titanium nitride as a nonstoichiometric material with an excess of titanium. Other exemplary materials include nonstoichiometric titanium carbide and titanium carbonitride. Some of the titanium compounds also include aluminum, tantalum, molybdenum or tungsten.

U.S. Pat. No. 5,271,749 discribes a sintered compact of CBN for use in cutting tools employing $Co_2Al_9$ and an aluminum containing material such as aluminum, aluminum nitride or aluminum diboride as sintering adjuvants. The process employs a substantial portion of hexagonal boron nitride as well as cubic boron nitride as a starting material. The preferred amount of adjuvant materials is from 2 to 10% by weight. Preferably, aluminum nitride is present from 2 to 7% by weight and $Co_2Al_9$ is present as from 1 to 4% by weight.

The blended ingredients are heat treated in a nonoxidizing atmosphere which may include ammonia at a temperature in the range of from 600° to 950° C. The mixture is placed on a cemtented tungsten carbide substrate and pressed at high temperature and pressure for forming a polycrystalline CBN layer on the carbide substrate. At the sintering temperature molten cobalt phase from the carbide substrate infiltrates into the mixture.

The U.S. Pat. No. 5,271,749 also describes an embodiment having a portion of titanium carbonitride (TiCN) comprising up to about 40% by weight of the total mixture. Other materials may be included such as carbide, nitride or carbonitride containing material of a group IVb, Vb or VIb transition metal. For example, a small amount of tungsten carbide may be included in the composition It is found in practice of this invention that a composite material having a major proportion of polycrystalline cubic boron nitride with a minor proportion of a supporting phase formed from titanium carbonitride or the like, and cobalt aluminide performs appreciably better in machining ferrous materials and workpieces which are difficult to machine because of hard materials or gaps in the cutting path which impact upon the cutting tool.

BRIEF SUMMARY OF THE INVENTION

There is, therefore, provided in practice of this invention according to a presently preferred embodiment, a polycrystalline cubic boron nitride cutting tool comprising a major proportion of cubic boron nitride crystals bonded together as a polycrystalline mass. A minor proportion of the cutting tool comprises a refractory supporting phase commingled with the polycrystalline cubic boron nitride. The refractory material preferably comprises titanium carbonitride or titanium aluminum carbonitride and a small proportion of cobalt aluminide such as $Co_2Al_9$. The supporting phase is defined by the starting materials and it will be noted that the final state of the supporting phase is a composite of various materials which have not been completely characterized.

It is found that a superior cutting tool can be made by pretreating a mixture of cubic boron nitride crystals, titanium carbonitride or titanium aluminum carbonitride powder and cobalt aluminide powder in ammonia at a temperature in excess of 1000° C.

DRAWINGS

These and other features and advantages of the present invention will be better understood by reference to the following detailed description when considered in connection with the accompanying drawings wherein:

FIG. 1 illustrates in side view an exemplary cutting tool;

FIG. 2 is a photomicrograph of a cutting tool composite comprising cubic boron nitride and a supporting phase.

DESCRIPTION

Figure 3:
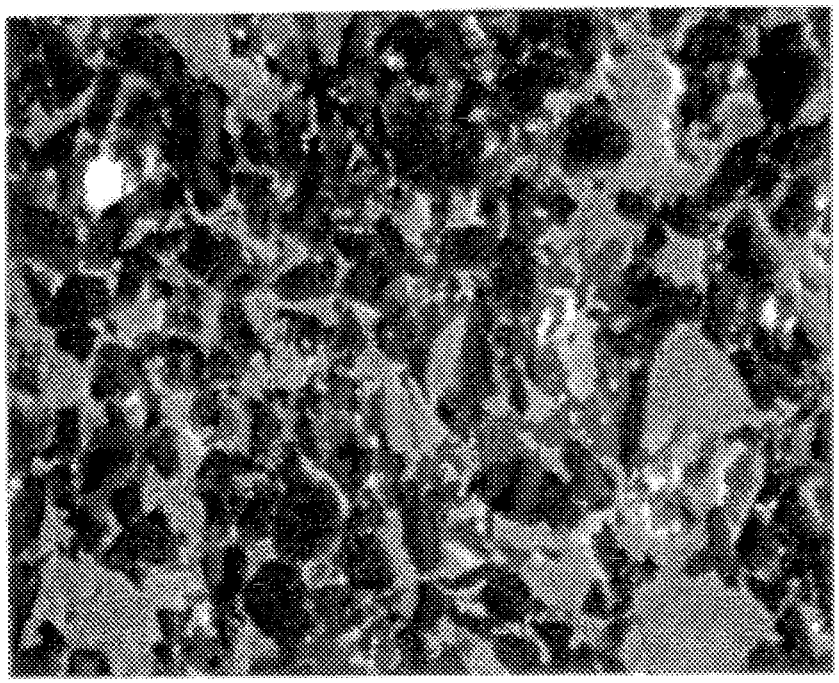
FIG. 3 illustrates in fragmentary side view a rock bit journal machined with such a cutting tool.

An exemplary cutting tool comprises a conventional cemented tungsten carbide substrate 11 having on at least one face a layer 12 of polycrystalline cubic boron nitride (PCBN). One edge of the cutting tool may have a clearance rake face 13 angled away from a cutting edge 14. Such a cutting tool is merely exemplary and it will be understood that other cutting tool geometries may be made in practice of this invention.

The cutting tool is typically made by first preparing a cemented tungsten carbide blank by conventional techniques. A typical cemented tungsten carbide body has particles of tungsten carbide, WC, bonded together with cobalt. Average tungsten carbide particle size may be in the range of from about 1 to 25 microns, with 5 to 10 microns being most typical. Cobalt content is typically in the range of from about 6 to 20 percent by weight. Although referred to as tungsten carbide, TiC, TaC and/or NbC may also be present.

A layer of powders that will form the PCBN layer is placed adjacent to a face of the carbide blank. This subassembly is placed in a protective can such as a cup of niobium, i.e., a layer of mixed powders may be placed in a can and a carbide blank placed over the layer of powders. A second cup is reversed over the first cup to form a closed can. The subassembly of two cups enclosing the carbide blank and layer of powder is pressed through a die to tightly encompass the contents in a closed can. A few such subassemblies of carbide blank and powder layer may be included in a can and separated by niobium disks. Other configurations may be used for forming other types of tools.

A closed can is then placed in a suitable heater in a pressure cell in a super high pressure press. Pressure is increased to a region where cubic boron nitride is thermodynamically stable. The cell in the press is then heated to a sufficient temperature for a sufficient time to form polycrystalline cubic boron nitride from the CBN crystals. Exemplary pressure in a super high pressure press may be 50 kilobars and temperatures in the order of 1500° C. may be maintained for five to fifteen minutes. Such high pressure, high temperature processing to form PCBN is well known and described in the prior art.

During such high temperature, high pressure processing the individual crystals of cubic boron nitride (CBN) become bonded together to form a polycrystalline mass. The resulting PCBN is a continuous phase and a refractory supporting phase is commingled with the PCBN phase. The supporting phase is formed from powders mixed with the CBN powder and near the interface with the substrate the composite may also include cobalt which infiltrates from the cemented tungsten carbide substrate. (Such infiltration seems to be limited to ten microns or less from the interface.)

After removal from the super pressure press, the cutting tool is cleaned, cut, ground and lapped as required to form the final geometry of the cutting tool.

In an exemplary embodiment the PCBN layer is formed from a mixture comprising from 50 to 85 percent by weight of cubic boron nitride crystals. A preferred embodiment has 55 to 65 percent CBN. The initial average CBN particle size may range from about a micron up to about thirty microns depending on the properties desired in the completed cutting tool. Crystals with different ranges of particle sizes may be employed as desired. For example, CBN with an average particle size of about three microns may be mixed with CBN with an average particle size of about fifteen microns for different "packing" than with a more uniform particle size throughout. It is preferred that the CBN have an average particle size of three microns or more. Material made from a CBN with a particle size smaller than about three microns is not as hard as with larger particle sizes.

Some economy may be achieved by substituting hexagonal boron nitride for a portion of the cubic boron nitride raw material. Furthermore, wurtzitic boron nitride may also be employed. Any such hexagonal and/or wurtzitic boron nitride included in the initial mixture is converted to cubic boron nitride under the high pressure high temperature conditions of the super pressure press. Using a portion of hexagonal boron nitride may be preferred because it is less costly than cubic boron nitride.

It is desirable to impart strength or toughness to the PCBN layer without significantly degrading its hardness and wear resistance. A supporting phase of refractory material is therefore formed, commingled with the PCBN. The preferred refractory material comprises titanium carbonitride or titanium aluminum carbonitride (referred to herein as TiCN or TiAlCN). These refractory materials are not stoichiometric compounds but appear to be solid solutions of titanium carbide and titanium nitride with varying proportions of carbon and nitrogen. Typically, titanium carbonitride employed in practice of this invention has approximately equal proportions of carbon and nitrogen.

The refractory material of the supporting phase may be defined as $(Ti_xM_y) C_zN_q$. The alloying element M may be one or more of aluminum, silicon, chromium, cobalt, tungsten and tantalum with aluminum, silicon, tungsten and tantalum being preferred and aluminum being particularly preferred. When the refractory material is titanium carbonitride, y is zero. Otherwise the proportion of alloying metal to titanium, y/x, is in the range of from 0.05 to 0.3. When the refractory material composition comprises titanium aluminum carbonitride, the aluminum is present up to about 30% of the total metal. Titanium aluminum carbonitride is a desirable material for enhanced chemical wear resistance and toughness.

An additional source of aluminum is desirable and is preferably in the form of cobalt aluminide $Co_2Al_9$.

A commercially available titanium carbonitride has a bulk composition of 49.4 atomic percent titanium, 22.8% nitrogen, 26% carbon, and 1.8% oxygen. This material has a wax coating on the particles in the order of one percent by weight added to the TiCN to impede oxidation. The bulk analysis just mentioned includes the wax and probably is skewed to higher carbon and oxygen content than the core of the particles of TiCN. Regardless, it is assumed that the TiCN has an apparent formula of $TiC_{0.52}N_{0.46}O_{0.04}$.

A surface analysis of the TiCN powder shows an apparent composition of 22.7 atomic percent titanium, 10% nitrogen, 40.7% carbon and 26.6% oxygen. Since this is inappropriate stoichiometry for a Ti-C-N-O composition, it suggests skewing due to the wax on the surface. One indirect measurement of wax content indicates that about 0.7 weight percent of carbon is present on the surface in the form of wax. There may also be surface oxidation, accounting for a portion of the apparent oxygen content of the TiCN.

It is found desirable to enhance the nitrogen content of the surface of the refractory material relative to the content of carbon. The material is therefore treated by a technique applicants have chosen to refer to as hypernitriding. The hypernitriding technique comprises heating the TiCN to elevated temperature in an environment of ammonia. The ammonia cracks to produce active hydrogen and nitrogen.

Preferably, the heat treatment is at a temperature of from 1000° to 1250° C. and most preferably at a temperature of at least 1100° C. The time of heating is preferably in the range of from about 1 to 5 hours, although longer times may be required at relatively lower temperatures. The temperature may be hotter than 1250° C., but only a marginal increase in results was noted after heating at 1250° C. and no good reason is known for higher temperatures. In an exemplary embodiment, the hypernitriding treatment comprises heating the TiCN powder at 1125° C. for about 1.5 to 2 hours.

After such treatment, the TiCN has a bulk composition of 49.9 atomic percent titanium, 26.5% nitrogen, 22.7% carbon, and 1% oxygen. It is hypothesized that the active hydrogen from cracking ammonia reacts with carbon and oxygen, removing them as gaseous products. Hydrogen is known to actively decarburize other materials.

It is also hypothesized that the change in nitrogen and carbon in the TiCN is primarily in a layer adjacent to the surface of the particles, probably with a depth of no more than ½ to one micron. It is believed that rate limiting factors in hypernitriding are related to the diffusion of carbon from the interior of a particle to a surface where reaction can occur with active hydrogen, and by diffusion of nitrogen into the TiCN to fill lattice sites vacated by carbon. Hydrogen is known to be soluble in titanium at elevated temperature and diffusion of hydrogen is probably much higher in TiCN than either the carbon or nitrogen or reaction products of those elements with hydrogen.

It is believed that the sites within the crystal lattice occupied by carbon are occupied by nitrogen as the carbon is depleted. Measurement of crystal lattice constants following hypernitriding have failed to disclose any change in the lattice constants. This is interpreted as confirmation that the effect of hypernitriding is to increase nitrogen content near the surface at the expense of carbon. The surface layer is relatively thin and the X-ray measurements are believed to be dominated by the interior core material.

It is believed that the increase in nitrogen content at the surface enhances bonding of the TiCN to the cubic boron nitride particles during high pressure, high temperature processing. It is hypothesized that the surface skin of the titanium carbonitride may consist largely of titanium nitride with a graded composition between the outermost surface and the core established by diffusion of carbon and nitrogen. Mobility of the nitrogen near the surface and in CBN would enhance bonding. Thus, after hypernitriding the particles of TiCN apparently comprise a core of unaltered TiCN with a thin surface layer which readily bonds to the CBN. The properties of the core material provide enhanced performance of the PCBN composite.

The surface of the TiCN particles after hypernitriding may also have graphitic or amorphous carbon present due to decomposition of the wax.

Hypernitriding enhances bonding without degrading the superior properties of the TiCN in the PCBN composition. This can be seen from a comparison of the composite PCBN material with a commercially available cutting tool material employing CBN and titanium nitride. In a very difficult turning test where the tool is subjected to impact loading, the average number of parts turned by the new tool material is almost twice as many as turned by the best known prior material for this application (22 parts versus 12 parts).

It is preferred to form a premixture of powders of CBN, TiCN and $Co_2Al_9$ before hypernitriding. For example, a preferred composition can be prepared by mixing from 30 to 40% by weight of TiCN powder having an average particle size of 10 microns or less, from 50 to 65% by weight of CBN crystals having an average particle size of 10 microns or less, and from 4 to 10% by weight of cobalt aluminide having a similar particle size. The mixture of powders is then heated in ammonia for one and a half to two hours at 1125° C.

In addition to hypernitriding the TiCN, it is believed that this treatment also enhances the CBN. Specifically, any boron oxides on the CBN surfaces should be reduced by the highly active hydrogen. The active nitrogen should assure stoichiometry of the boron nitride which is sometimes deficient in nitrogen.

It is believed that hypernitriding enhances CBN—CBN intercrystalline bonding as well as bonding between CBN and TiCN. The additional nitrogen which may be present in the CBN phase as well as at the surface of the TiCN phase is believed to promote transfer mechanisms.

It is surprising that this hypernitriding treatment is effective in a mixture including cobalt aluminide. According to the Al-Co phase diagram $Co_2Al_9$ has a decomposition temperature at 944° C. where there should be liquid phase and a γ phase which is stable to higher temperatures. Somewhere around 1100° C. the $Co_2Al_9$ composition would appear to be completely melted. For some unexplained reason, however, the cobalt aluminide particles appear to remain intact. A possibility is that a strong and stable aluminum nitride surface forms, with a melting point in excess of 2000° C., which keeps particles intact even if a portion of the particle is molten. As pointed out hereinafter, there is some evidence in support of this hypothesis.

Another possibility is that there is reaction between TiCN and cobalt aluminide, producing a material that is a nonstoichiometric TiAlCN. Cobalt aluminide may remain present as a δ phase which decomposes at 1172° C. or as CoAl which has a melting point of almost 1650° C. Regardless of the phenomena occurring, the hypernitriding treatment is contrary to conventional belief that pretreatment should not exceed the melting temperature of a powder compound.

The powders may be separately hypernitrided or partial mixtures may be hypernitrided. For example, a pre-mixture of titanium carbonitride and $Co_2Al_9$ may be made and hypernitrided before mixing with CBN powder which is separately prepared for pressing by known techniques.

After hypernitriding the mixed powders, a polycrystalline cubic boron nitride compact is made by essentially conventional techniques. A layer of mixed powders is formed adjacent to a cemented tungsten carbide substrate in a refractory metal "can" such as niobium. This assembly is then pressed in a super pressure press at high temperature and pressure where the cubic boron nitride is thermodynamically stable. Pressing for 5 to 15 minutes forms a polycrystalline CBN mass with interspersed titanium carbonitride domains which provide mechanical support for the PCBN.

The cobalt aluminide appears to catalyze the recrystallization and bonding of the CBN as well as promoting a strong interfacial bond between the CBN and TiCN. Based on study of the final composite material, other sources of cobalt and aluminum may be equivalent starting materials. Coatings of cobalt and/or aluminum on other particles in the mixture may be suitable.

It is believed that a source of nitrogen external to the CBN is significant for good intercrystalline bonding. This may promote bonding of the TiCN as well. Aluminum nitride is a suitable source of nitrogen. Hypernitriding cobalt aluminide may produce aluminum nitride which serves as a source of nitrogen during high pressure, high temperature pressing. Aluminum nitride powder may be included in the composition. Silicon nitride may also be included in the composition as a source of nitrogen or may result from hypernitriding of a composition including aluminum-silicon alloy powder. Other equivalent sources of nitrogen may be employed.

The cubic boron nitride composite is characterized by the starting materials herein since these are well known. The composite after high-pressure, high-temperature pressing is quite complex and may not be completely characterized. For example, in an exemplary embodiment the composite is made from CBN crystals, titanium carbonitride, and $Co_2Al_9$. This latter material has not been found in the final composite and its constituents are apparently present in at least two other phases.

Microscopic examination and analysis of the composite material, a photomicrograph of which is illustrated in FIG. 2, comprises CBN crystals bonded together as PCBN, and interspersed domains rich in titanium carbonitride. The TiCN domain itself is made up of a few separate phases.

The CBN phase is apparently pure BN as far as can be determined. The somewhat irregular grains are typically in the size rage of about 1 to 5 microns.

The TiCN domains comprise TiCN grains and what appears to be a cobalt rich binder. These domains are also of an irregular shape and have sizes in the range of from about 1 to 10 microns. The cobalt content varies widely between different domains, which is probably a consequence of non-uniform distribution of the initial TiCN and $Co_2Al_9$ particles. The carbon to nitrogen ratio in the TiCN appears to be close to one. The oxygen concentration is quite low, apparently less than one atomic percent.

The TiCN rich domains contain small amounts of tungsten which appears to be dissolved in cobalt. In a few areas tungsten has also been detected where cobalt is not present. This latter tungsten may be present as tungsten carbide. Tungsten carbide may be present in small amounts, less than two weight percent, as a result of the techniques used for blending the powders. The powders are blended by mixing CBN crystals, TiCN grains, and $Co_2Al_9$ particles. An apparently homogeneous mixture is made by tumbling in a ball mill lined with cemented tungsten carbide, and containing cemented tungsten carbide balls. A small amount of tungsten carbide and even smaller amount of cobalt may be introduced due to erosion of the balls and mill liner.

The cobalt rich binder phase shows a large variation in size and in tungsten content. Sizes ranging from about 50 nanometers to 5 microns have been observed. The tungsten content varies with some regions having from 1 to 5 atomic percent tungsten in the cobalt and other regions having up to 30 atomic percent tungsten. The crystal structure of the cobalt rich phase is not known but it is possible that some of the low tungsten content cobalt is face centered cubic and the high tungsten regions are eta phase.

Aluminum rich phases are also found with sizes ranging from about 1 to 10 microns. These relatively large regions appear to contain AlN, $Al_2O_3$ and possibly $AlN_xO_y$. At least some of these large aluminum rich domains have a cobalt rich core surrounded by aluminum rich phases. In addition, very small, i.e. less than about 50 nanometers, aluminum rich phases may also be found embedded in the titanium carbonitride domains.

Thus, the PCBN composite is complex after pressing and is characterized herein by its starting materials, rather than the final composite.

Another desirable PCBN composite compact is formed from 80% by weight CBN (up to about half of which may be hexagonal boron nitride (HBN)), 15% by weight TiCN and 5% by weight $Co_2Al_9$. A good PCBN composition for rough machining comprises about 93 to 94% by weight CBN (up to half of which may be HBN), about 4 to 5% aluminum nitride and about 2% cobalt aluminide. A composition with 55 to 60% CBN, 35% TiCN and 4 to 10% cobalt aluminide is excellent for finish machining. A composition comprising about 80% CBN, 15% TiCN, and 5% cobalt aluminide has a good combination of hardness, wear resistance and impact strength for both rough and finish machining operations, thereby permitting a single tool to be used for both.

Experimental cutting tools made as described above have been used for a very difficult machining task and proved superior to commercially available cubic boron nitride cutting tools. An exemplary tool comprised as raw materials 57% by weight cubic boron nitride crystals, 35% TiCN, 8% $Co_2Al_9$ and up to about 2% by weight of tungsten carbide picked up as an impurity during ball milling to form the initial mixture of particles.

The TiCN, as received, was commercially available titanium carbonitride having a bulk composition of 49.4 atomic percent titanium, 22.8% nitrogen, 26% carbon, and 1.8% oxygen. A small amount of wax was present to impede oxidation. The mixed particles of CBN, TiCN and $Co_2Al_9$ were hypernitrided as described above. The mixed powders were formed into a polycrystalline cubic boron nitride composite on a cemented tungsten carbon substrate.

The machining task was finish machining on the steel journal of one leg of a rock bit. Such a journal is illustrated in FIG. 3 at the end of a leg 20 of a rock bit. Near the leg end of the journal is a sealing surface 21 for receiving an 0-ring or the like. Next is a cylindrical journal bearing surface 22 and ball race 23. An end face 24 and spindle 25 on the journal are provided with a hardfacing material 26 which has a hardness much greater than the hardness of the forged steel of the journal.

The machining task is made particularly difficult since a portion of the journal bearing surface includes an inset pad 27 of hardfacing material extending around a portion of the circumference and there is interruption 28 on the opposite side of the cylindrical surface adjacent to a lubricant passage 29. The CBN cutting tool must not only cut hardfacing material and steel but also is subjected to impact type loading upon encountering the interruption and hardfacing pad as the journal rotates.

Finish machining of such a rock bit journal has a nominal speed of 350 surface feet per minute (105 m/min). The rate of tool advance is about 0.002 inch per revolution (50 microns per revolution). The depth of cut ranges from about 0.005 to 0.008 inch (0.13 to 0.2 mm). Such machining develops high temperatures at the tool point.

Cutting tools used for machining such journals have been made from a material identified as BN250 sold by Sumitomo Electric Industries, Ltd. of Osaka, Japan. These tools comprise a layer of cubic boron nitride and titanium nitride on a cemented tungsten carbide substrate and are believed to be made in accordance with U.S. Pat. No. 4,334,928 by Hara. According to the Hara patent, a preferred composition comprises substoichiometric titanium nitride $TiN_{1\pm x}$ where $(1\pm x)$ is less than 0.97. The patent also mentions tool materials comprising CBN and titanium carbide or titanium carbonitride.

Such cutting tools made of the BN250 material machine an average of about 12 such rock bit journals per tool point before the tool is no longer usable. Experimental cutting tools made as described above of PCBN and TiCN machine an average of about 22 such rock bit journals per tool point. Another commercially available material made with CBN and titanium nitride machines an average of about 9 rock bit journals per tool point. The best previously known material for this difficult machining task was the Sumitomo BN250 material.

The PCBN composite including TiCN described above has a Vickers microhardness of 2701. The Vickers microhardness of the BN250 material is 2519. Crack resistance of such CBN materials is measured by examining the surface of the material adjacent to a Vickers hardness indentation. Crack resistance is defined as the test load in kilograms applied to the pyramid indenter divided by the total crack length in millimeters, projecting from the four corners of the indentation. The crack resistance of the PCBN material including TiCN was measured at 37 kg/mm. The Sumitomo BN250 material showed a crack resistance of 32 kg/mm.

The techniques for making composite PCBN compacts as described above have started with a mixture of powders. An alternative is to coat titanium carbonitride, titanium carbide, titanium nitride or titanium aluminum carbonitride particles with a thin layer of cobalt and/or aluminum or cobalt aluminide before mixing with the CBN crystals. Cobalt aluminide, cobalt or aluminum can be deposited on these particles by plasma vapor deposition or metalorganic chemical vapor deposition. Suitable PVD or MOCVD processes are well known. One may also deposit titanium carbonitride or titanium aluminum carbonitride on CBN crystals. Such coated particles promote good intercrystalline bonding in a PCBN compact. The coated particles may also be hypernitrided before or after mixing.

In the compositions described above, the boron nitride starting material has been cubic boron nitride. It will be recognized that a portion of the CBN may be replaced by hexagonal boron nitride (HBN) or wurtzitic boron nitride. These materials transform to CBN at the elevated temperatures and pressures where CBN is thermodynamically stable.

The titanium carbonitride used in the tests described herein has a carbon to nitrogen ratio in the order of one, i.e. the formula could be stated as $TiC_{0.5}N_{0.5}$. It has been found that with titanium carbide and titanium nitride as the supporting phase there may be lower hardness in the composite material than with titanium carbonitride and there appears to be some non-uniformity of hardness. Thus, it appears that both carbon and nitrogen are significantly involved in promoting strength, chemical resistance, intercrystalline bonding, or other properties associated with successful tool materials. Thus, the proportions of carbon and nitrogen, C:N, in the composition preferably are in the range of from 4:1 to 1:4. The formula for the compound preferably is in the range of from $TiC_{0.8}N_{0.2}$ to $TiC_{0.2}N_{0.8}$. A similar range of carbon to nitrogen ratio is preferred for titanium aluminum carbonitride.

Many other modifications and variations of the present invention will be appreciated by those skilled in the art. Thus, for example, although cobalt aluminide is a preferred material employed in making a composite PCBN, nickel aluminide may be equivalent in some applications. Although PVD and MOCVD have been mentioned as techniques for coating particles, other coating techniques may be substituted. Different combinations of coated particles may also be employed. Although it is preferred to employ titanium carbonitride in practice of this invention, hypernitriding of titanium carbide and/or titanium nitride may make them suitable replacements for some or all of the hypernitrided titanium carbonitride. Many other modifications and variations will be apparent and it is therefore to be understood that within the scope of the appended claims, this invention may be practiced otherwise than is specifically described.

What is claimed is:

1. A polycrystalline cubic boron nitride cutting tool comprising:
   a body comprising cubic boron nitride in the range of from 50 to 85 percent by weight bonded together as a polycrystalline mass; and
   a supporting phase commingled with the polycrystalline cubic boron nitride and formed from 15 to 40 percent by weight of a material selected from the group consisting of titanium carbonitride and titanium aluminum carbonitride, and from 4 to 10 percent by weight $Co_2Al_9$ combined with the supporting phase.

2. A polycrystalline cubic boron nitride cutting tool as recited in claim 1 wherein a portion of the titanium is substituted by an element selected from the group consisting of silicon, tantalum and tungsten.

3. A polycrystalline cubic boron nitride cutting tool as recited in claim 1 wherein the supporting phase is formed from at least a portion of titanium carbonitride or titanium aluminum carbonitride particles having a surface layer with a higher concentration of nitrogen than the core of the titanium carbonitride or titanium aluminum carbonitride particles.

4. A polycrystalline cubic boron nitride cutting tool as recited in claim 1 wherein the titanium carbonitride is present in the range of from 30 to 40% by weight and the cubic boron nitride is present in the range of 50 to 65 percent by weight.

5. A polycrystalline cubic boron nitride cutting tool as recited in claim 1 wherein a portion of the titanium is substituted by an element selected from the group consisting of silicon, tantalum, cobalt, chromium and tungsten.

6. A polycrystalline cubic boron nitride cutting tool as recited in claim 1 wherein the ratio of carbon to nitrogen in the carbonitride or titanium aluminum carbonitride is in the range of from 4:1 to 1:4.

7. A polycrystalline cubic boron nitride cutting tool comprising:
   cubic boron nitride crystals in the range of from 50 to 85 percent by weight bonded together as a polycrystalline mass; and
   a supporting phase commingled with the polycrystalline cubic boron, nitride and formed from a material originally in the form of a powder having:
   a core of refractory material in the range of from 15 to 40 percent by weight selected from the group consisting of titanium carbonitride and titanium aluminum carbonitride, and
   a surface layer having a higher concentration of nitrogen than the core of the titanium carbonitride or titanium aluminum carbonitride powder.

8. A polycrystalline cubic boron nitride cutting tool as recited in claim 7 wherein the surface of the powder consists essentially of titanium nitride.

9. A polycrystalline cubic boron nitride cutting tool as recited in claim 7 wherein a portion of the titanium is substituted by an element selected from the group consisting of silicon, tantalum and tungsten.

10. A polycrystalline cubic boron nitride cutting tool as recited in claim 7 further comprising a minor proportion of $Co_2Al_9$ in the range of from 4 to 10 percent by weight combined with the supporting phase.

11. A polycrystalline cubic boron nitride cutting tool as recited in claim 7 wherein the ratio of carbon to nitrogen in the carbonitride or titanium aluminum carbonitride is in the range of from 4:1 to 1:4.

12. A polycrystalline cubic boron nitride cutting tool comprising:
   a major proportion of cubic boron nitride crystals in the range of from 50 to 85 percent by weight bonded together as a polycrystalline mass;
   a minor proportion of a supporting phase commingled with the polycrystalline cubic boron nitride and formed from a material originally in the form of powder having
   a core of refractory material formed from 15 to 40 percent by weight of a material selected from the group consisting of titanium carbide, titanium carbonitride and titanium aluminum carbonitride wherein a portion of the titanium is substituted by an element selected from the group consisting of silicon, tantalum, cobalt, chromium, and tungsten, and
   a skin having a higher concentration of nitrogen than the core of the titanium carbide, titanium carbonitride or titanium aluminum carbonitride powder.

13. A polycrystalline cubic boron nitride cutting tool as recited in claim 12 wherein the skin consists essentially of titanium nitride.

14. A polycrystalline cubic boron nitride cutting tool as recited in claim 12 further comprising a minor proportion of $Co_2Al_9$ in the range of from 4 to 10 percent by weight combined with the supporting phase.

15. A polycrystalline cubic boron nitride cutting tool as recited in claim 12 wherein the cubic boron nitride in the range of from 50 to 85 percent by weight, the titanium carbide, titanium carbonitride or titanium aluminum carbonitride is present in the range of from 15 to 40 percent by weight and the $Co_2Al_9$ is present in the range of from 4 to 10 percent by weight.

16. A refractory powder comprising:

particles of a titanium-carbon-nitrogen composition with an interior core having a relatively lower nitrogen content relative to the sum of titanium and carbon and an exterior surface layer having a relatively higher nitrogen content relative to the sum of titanium and carbon.

17. A titanium carbonitride powder as recited in claim 16 wherein a portion of the titanium is substituted by an element selected from the group consisting of aluminum, silicon, tantalum, cobalt, chromium and tungsten.

18. A titanium carbonitride powder as recited in claim 16 wherein the surface layer consists essentially of titanium nitride.

* * * * *